(12) United States Patent  
Tiong

(10) Patent No.: US 7,448,297 B2  
(45) Date of Patent: Nov. 11, 2008

(54) MOUNTABLE BICYCLE STRUCTURE

(75) Inventor: Khoo Kean Tiong, Singapore (SG)

(73) Assignee: Shimano (Singapore) Pte., Ltd, Jurong Town (SG)

( * ) Notice: Subject to any disclaimer, the term of this patent is extended or adjusted under 35 U.S.C. 154(b) by 712 days.

(21) Appl. No.: 10/910,631

(22) Filed: Aug. 4, 2004

(65) Prior Publication Data

US 2006/0053954 A1    Mar. 16, 2006

(51) Int. Cl.  
*B62K 21/12*    (2006.01)  
*F16D 1/10*    (2006.01)  
*F16B 2/10*    (2006.01)

(52) U.S. Cl. ............... 74/551.8; 403/289; 403/290; 403/373; 403/383; 248/311.2; 248/313; 24/285

(58) Field of Classification Search .......... 74/551.8; 248/311.2, 313, 222.12, 222.13, 230.1, 230.2, 248/230.9, 316.1, 62, 68.1, 69, 74.1; 403/289, 403/290, 373, 383; *F16B 2/10*  
See application file for complete search history.

(56) References Cited

U.S. PATENT DOCUMENTS

| | | | | |
|---|---|---|---|---|
| 1,883,041 | A * | 10/1932 | Somers | ............... 24/285 |
| 4,191,393 | A | 3/1980 | Niemann | |
| 5,052,241 | A | 10/1991 | Nagano | |
| 5,121,946 | A | 6/1992 | Jardine | |
| 5,325,735 | A | 7/1994 | Nagano | |
| 5,370,412 | A | 12/1994 | Chou | |
| 5,522,527 | A | 6/1996 | Tsai | |
| 5,735,441 | A | 4/1998 | Fujimoto | |
| 5,772,253 | A * | 6/1998 | Hodge et al. | ............... 285/15 |
| 5,921,139 | A | 7/1999 | Yamane | |
| 6,062,053 | A | 5/2000 | Ho | |
| 6,146,298 | A | 11/2000 | Nanko | |
| 6,199,446 | B1 | 3/2001 | Ose | |
| 6,276,227 | B1 | 8/2001 | Ose | |
| 6,331,089 | B1 | 12/2001 | Iteya | |
| 6,453,766 | B1 | 9/2002 | Ose | |
| 6,663,068 | B2 * | 12/2003 | Huang | ............... 248/311.2 |
| 2006/0029465 | A1 * | 2/2006 | Auer | ............... 403/383 |

FOREIGN PATENT DOCUMENTS

| | | |
|---|---|---|
| DE | 74 05 253 U | 2/1974 |
| DE | 78 28 291 U1 | 1/1979 |
| DE | 32 05 263 C2 | 9/1983 |
| DE | 93 07 485 U1 | 8/1993 |
| DE | 695 11 812 T2 | 1/2000 |

(Continued)

*Primary Examiner*—Vinh T. Luong  
(74) *Attorney, Agent, or Firm*—Global IP Counselors, LLP

(57) ABSTRACT

A mountable bicycle structure is provided that can be clamped onto different sized tubular members such as handlebars by using different adapter members. The mountable bicycle structure basically includes a component support portion, a tubular clamping portion, a tightening structure and an adapter member. The tubular clamping portion has a split ring configuration to define an adjustable inner diameter that extends around a center axis. The tightening structure is coupled to first and second ends of the tubular clamping portion to selectively reduce the adjustable inner diameter. The adapter member has a split ring configuration with an outer surface removably arranged on the inner surface of the tubular clamping portion. The tubular clamping portion and the adapter member are arranged and configured to align the split of the adapter member with the attachment slot of the tubular clamping portion.

20 Claims, 10 Drawing Sheets

FOREIGN PATENT DOCUMENTS

| | | |
|---|---|---|
| DE | 299 20 778 U1 | 3/2000 |
| DE | 200 08 582 U1 | 8/2000 |
| EP | 0 648 666 B1 | 4/1995 |
| EP | 1 040 991 A2 | 10/2000 |
| JP | 33-19912 U | 12/1958 |
| JP | 57-195989 U | 12/1982 |
| JP | 04-51889 U | 4/1992 |
| JP | 09-273521 A | 10/1997 |
| JP | 2000-233781 A | 8/2000 |
| WO | WO 96/30656 | * 10/1996 |

* cited by examiner

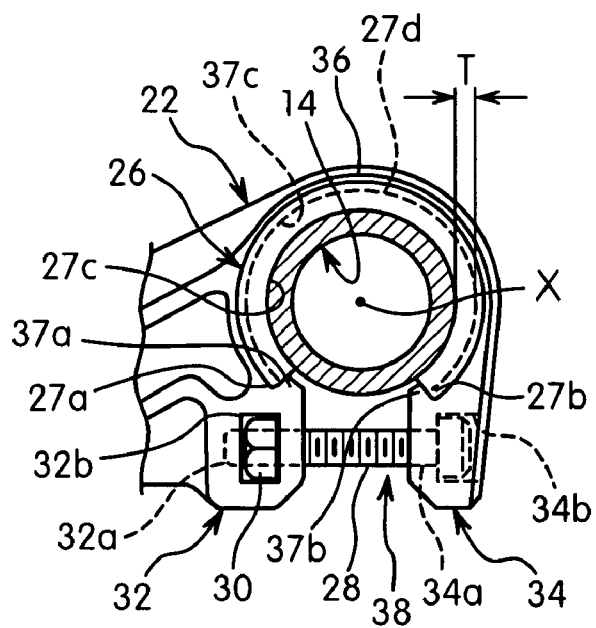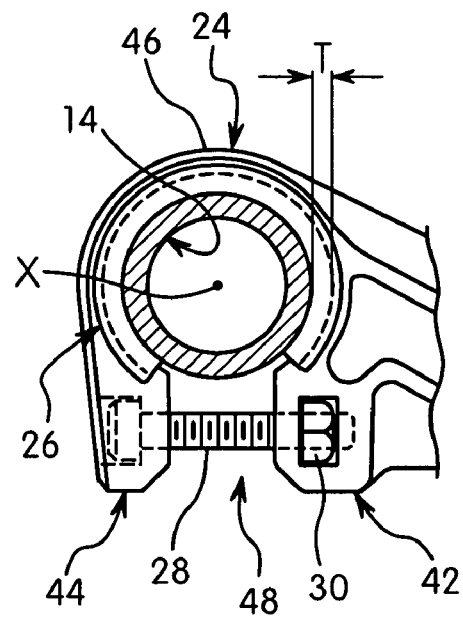
Fig. 4          Fig. 5
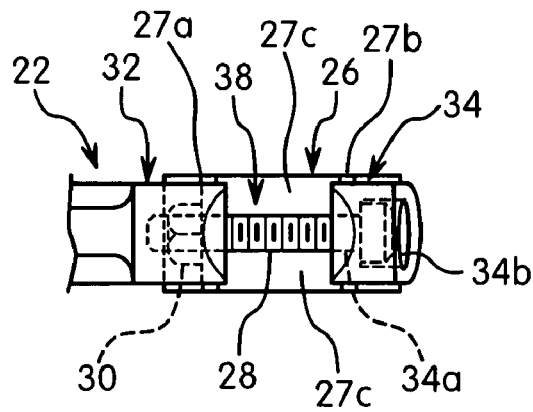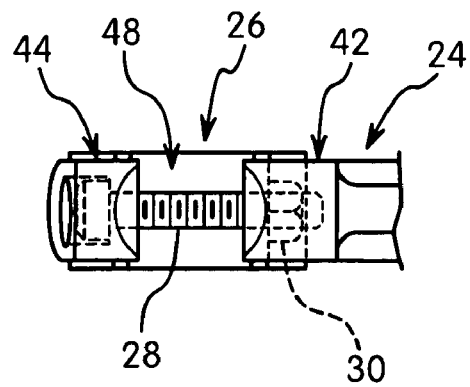
Fig. 6          Fig. 7

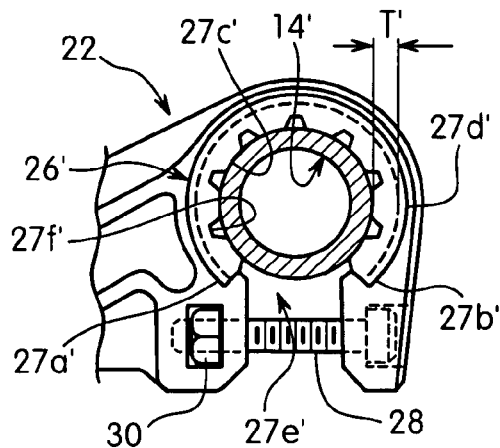
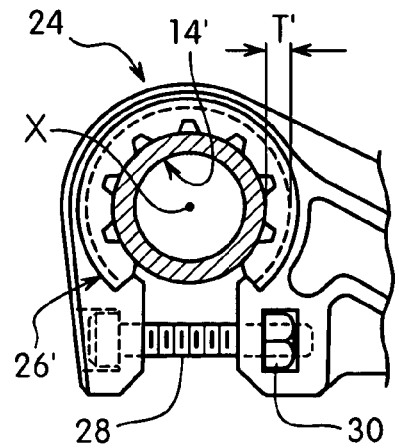
Fig. 12          Fig. 13
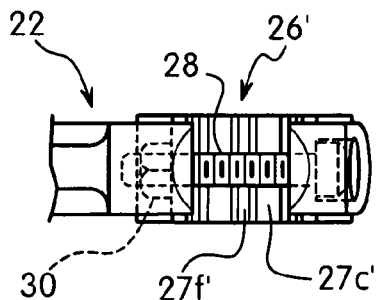
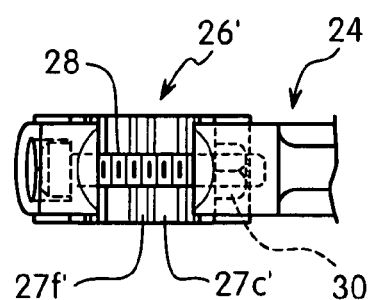
Fig. 14          Fig. 15
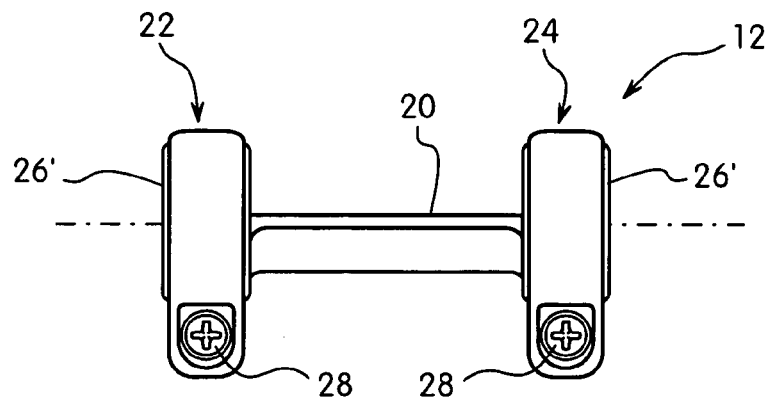
Fig. 16

MOUNTABLE BICYCLE STRUCTURE

BACKGROUND OF THE INVENTION

1. Field of the Invention

This invention generally relates to a mountable bicycle structure. More specifically, the present invention relates to a tubular clamping portion of the mountable bicycle structure, which utilizes an adapter in order to easily and reliably secure the mountable bicycle structure onto a bicycle element such as a handlebar.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Additionally, bicycles are constantly being designed so as to be more ergonomic and user friendly. In particular, various additional accessories and/or improved components have been developed in recent years to assist the rider in operating the various components of the bicycle and/or to make the riding experience more convenient and enjoyable for the rider.

For example, the shifting units of a bicycle are often located at the ends of the handlebar such that the rider can easily perform a shifting operation without significantly changing the position of the rider's hands. However, this positioning of the shifting units makes it difficult to determine the current gear position for the rider. Specifically, the shifting units typically will have some sort of gear position indicator, in which case the rider must look towards the sides (ends) of the handlebar in order to determine the current gear positions. This arrangement is inconvenient for the rider.

Accordingly, gear indicators have been developed which are mounted on a center portion of the bicycle handlebar so that the rider does not have to take his or her eyes off of the road to determine the current gear position. For example, U.S. Pat. No. 6,331,089 discloses such gear indicators. Other accessories and/or components such as bicycle computers and/or lights and the like have also been mounted to the center of the handlebar for the rider's convenience in recent years. These devices are usually clamped onto the bicycle handlebar using a conventional C-shaped clamping member. While all of these devices work relatively well, it can be difficult and/or complicated to install such accessories and/or components on the bicycle, especially on different sized handlebars. Moreover, these typical accessories and/or components can be relatively complicated and expensive to manufacture and assemble, especially when it is desirable to make these devices compatible with different sized handlebars.

In view of the above, it will be apparent to those skilled in the art from this disclosure that there exists a need for an improved mountable bicycle structure. This invention addresses this need in the art as well as other needs, which will become apparent to those skilled in the art from this disclosure.

SUMMARY OF THE INVENTION

One object of the present invention is to provide a mountable bicycle structure that can be easily and reliably mounted on a tubular member.

Another object of the present invention is to provide a mountable bicycle structure that can be easily and reliably mounted on different sized tubular members such as different sized handlebars, and which can be used to support several different components on the different sized handlebars.

Another object of the present invention is to provide a mountable bicycle structure that can be easily and rigidly secured on a center portion of the handlebar for easy viewing of a component that is coupled thereto.

Another object of the present invention is to provide a mountable bicycle structure that is strong, yet relatively lightweight.

Yet another object of the present invention is to provide a mountable bicycle structure that has a simple structure with relatively few separate parts.

Still another object of the present invention is to provide a mountable bicycle structure that that is relatively simple and inexpensive to manufacture using conventional manufacturing techniques.

The foregoing objects can basically be attained by providing a mountable bicycle structure that includes a component support portion, a tubular clamping portion, a tightening structure and an adapter member. The component support portion is configured and arranged to support a bicycle component. The tubular clamping portion is coupled to the component support portion. The tubular clamping portion has a split ring configuration with an attachment slot, a first end section, a second end section and an inner surface extending between the first and second end sections to define an adjustable inner diameter that extends around a center axis. The tightening structure is coupled to the first and second end sections of the tubular clamping portion to selectively reduce the adjustable inner diameter of the tubular clamping portion. The adapter member has a split ring configuration with an outer surface removably arranged on the inner surface of the tubular clamping portion. The adapter member has a pair of free ends with a split therebetween. The inner surface of the tubular clamping portion and the adapter member are arranged and configured to align the split of the adapter member with the attachment slot.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 4 is a partial, cross-sectional view of the portion of the handlebar and the mountable bicycle structure illustrated in FIGS. 2 and 3, as seen along section line 4-4 of FIG. 2;

FIG. 5 is a partial, cross-sectional view of the portion of the handlebar and the mountable bicycle structure illustrated in FIGS. 2 and 3, as seen along section line 5-5 of FIG. 2;

FIG. 6 is a bottom plan view of the portion of the mountable bicycle structure illustrated in FIG. 4, with the handlebar removed for the purpose of illustration;

FIG. 7 is a bottom plan view of the portion of the mountable bicycle structure illustrated in FIG. 5, with the handlebar removed for the purpose of illustration;

FIG. 12 is a partial, cross-sectional view of the portion of the handlebar and the mountable bicycle structure illustrated in FIGS. 10 and 11, as seen along section line 12-12 of FIG. 10;

FIG. 13 is a partial, cross-sectional view of the portion of the handlebar and the mountable bicycle structure illustrated in FIGS. 2 and 3, as seen along section line 13-13 of FIG. 10;

FIG. 14 is a bottom plan view of the portion of the mountable bicycle structure illustrated in FIG. 12, with the handlebar removed for the purpose of illustration;

FIG. 15 is a bottom plan view of the portion of the mountable bicycle structure illustrated in FIG. 13, with the handlebar removed for the purpose of illustration;

FIG. 16 is a rear elevational view of the mounting member of the mountable bicycle structure illustrated in FIGS. 10-15, with the handlebar and indicator displays removed for the purpose of illustration;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
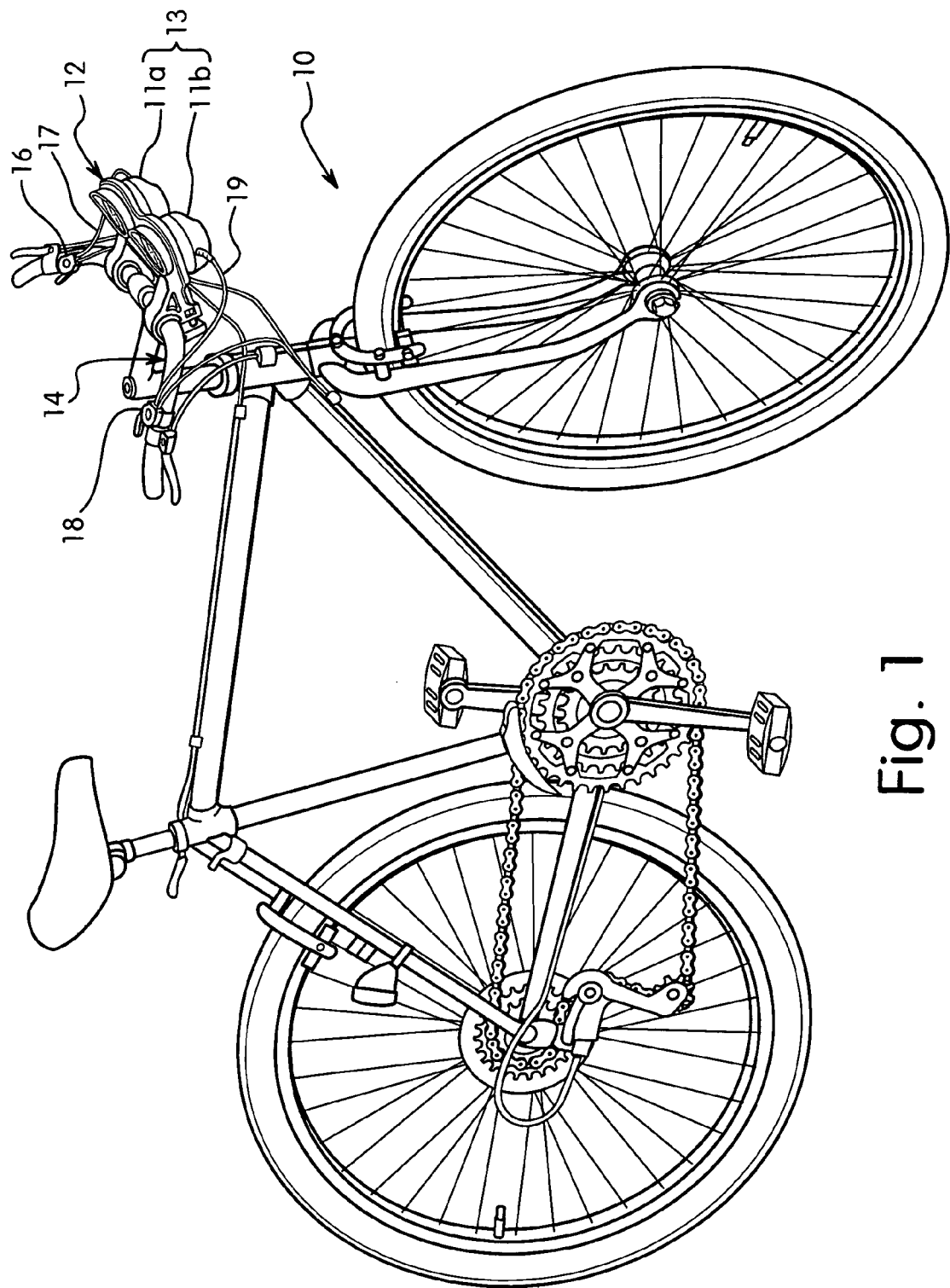
FIG. 1 is a side perspective view of a conventional bicycle equipped with a mountable bicycle structure in accordance with a first embodiment of the present invention.
Figure 2:
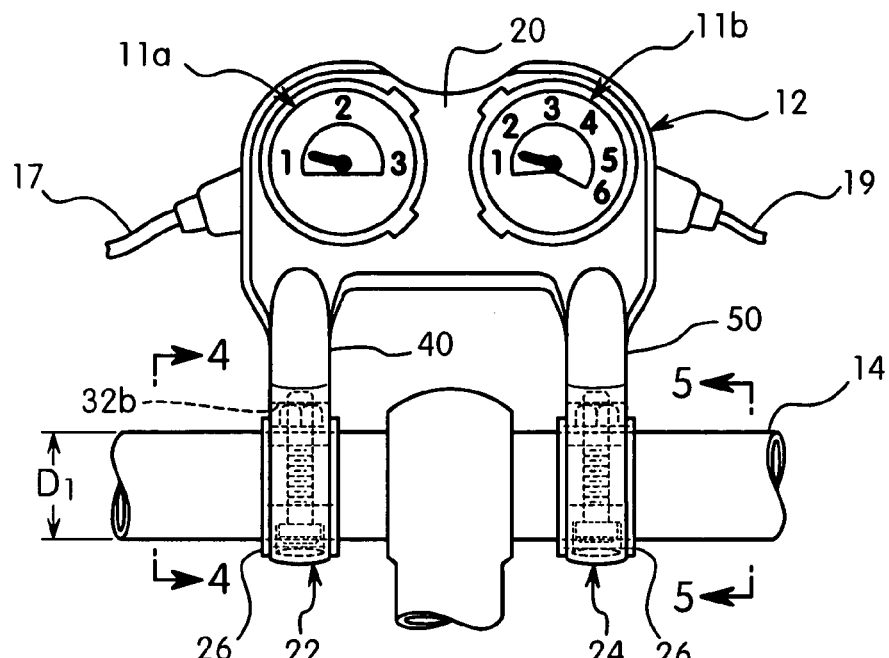
FIG. 2 is an enlarged, partial top plan view of the handlebar equipped with the mountable bicycle structure of the bicycle illustrated in FIG. 1.
Figure 3:
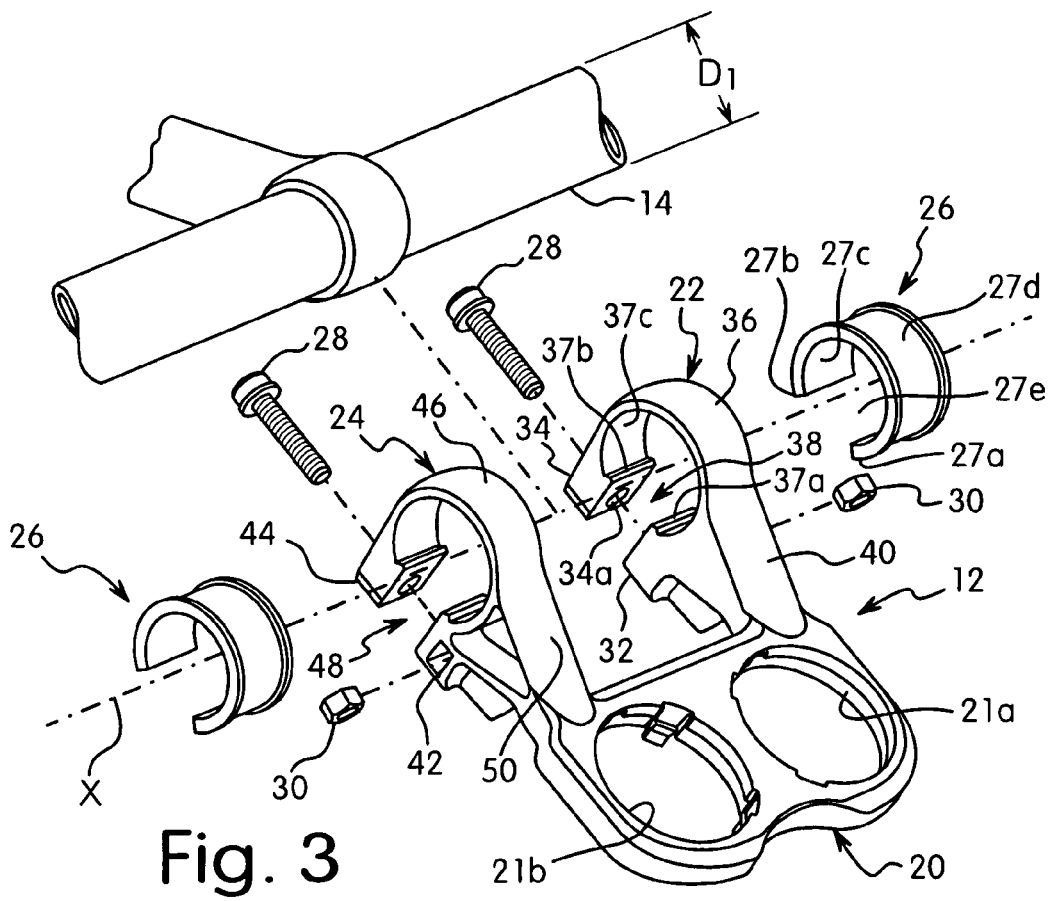
FIG. 3 is an exploded, top perspective view of the portion of the handlebar and the mounting member of the mountable bicycle structure illustrated in FIG. 2.
Figure 8:
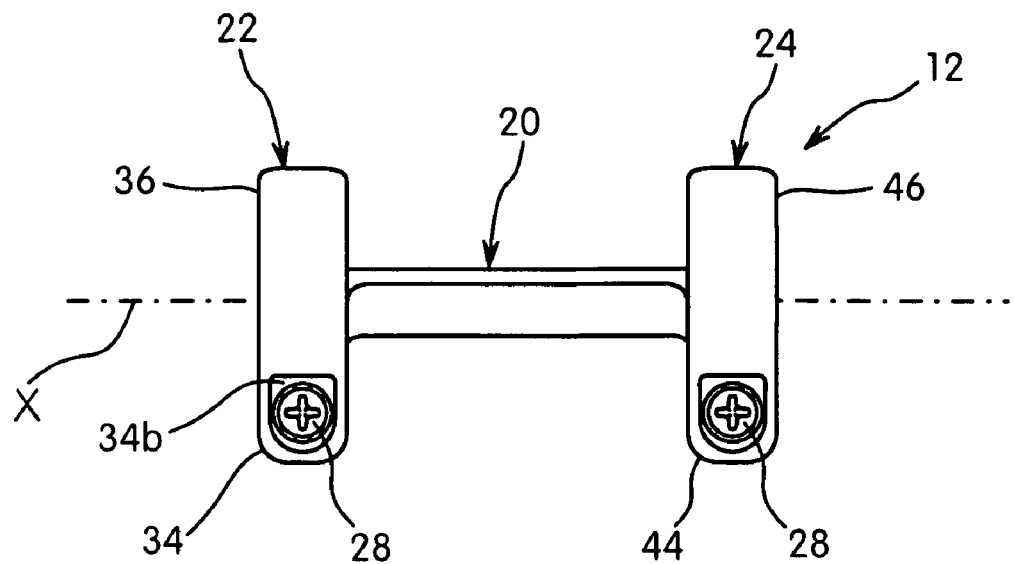
FIG. 8 is a rear elevational view of the mounting member of the mountable bicycle structure illustrated in FIGS. 2-7, with the handlebar and indicator displays removed for the purpose of illustration.

Referring initially to FIG. 1, a bicycle 10 is illustrated with a pair of gear indicator displays 11a and 11b supported by a mounting member 12 in accordance with a first embodiment of the present invention. The pair of gear indicator displays form parts of a display device 13. The bicycle 10 is basically a conventional bicycle, except that the display device 13 (bicycle component) is supported on a handlebar 14 via the mounting member 12 in accordance with the present invention. Specifically, the mounting member 12 is clamped onto the handlebar 14 using a pair of curved adapters 26 that are sized and configured for the particular handlebar 14, as explained below. Of course, it will be apparent to those skilled in the art from this disclosure that the mounting member 12 can be used with modified adapter members 26' when the bicycle 10 has a smaller diameter handlebar 14'. The handlebars 14 and 14' are identical, except that the handlebar 14' has an outer diameter $D_2$ that is smaller than an outer diameter $D_1$ of the handlebar 14.

Because the bicycle 10 is basically conventional, the bicycle 10 will not be discussed and/or illustrated in detail herein, except as related to the present invention. Moreover, it will be apparent to those skilled in the art from this disclosure that various modifications can be made to the bicycle 10 and/or the various components of the bicycle 10 without departing from the scope of the present invention described and illustrated herein.

The display device 13 is actuated by a pair of shifting units 16 and 18 that are mounted at opposite ends of the handlebar 14 in a conventional manner. Specifically, the shifting units 16 and 18 are operatively coupled to gear indicator displays 11a and 11b of the display device 13 via a pair of indicator cables 17 and 19, respectively, such that the display device 13 indicates appropriate gear positions of the drive train in a conventional manner. The shifting units 16 and 18 also have shift cables extending therefrom to control the derailleurs of the drive train of the bicycle 10 in a conventional manner.

The shifting units 16 and 18 are well known in the bicycle art, and are not critical to the present invention. Thus, the shifting units 16 and 18 will not be discussed and/or illustrated in detail herein. Rather, it will be apparent to those skilled in the art from this disclosure that different types of shifting units can be used with the display device 13. Similarly, the display device 13 is well known in the bicycle art, except the manner in which the display device 13 is supported on the handlebar 14 by the mounting member 12. For the sake of convenience, the display device 13 and the shifting units 16 and 18 are preferably configured in accordance with U.S. Pat. No. 6,331,089. In other words, for the sake of brevity, the display device 13 and the shifting units 16 and 18 will only be discussed and illustrated herein as needed to understand the present invention.

However, it will be apparent to those skilled in the art that the display device 13 and the shifting units 16 and 18 can be modified as needed and/or desired, as long as the display device 13 and the shifting units 16 and 18 are compatible with each other. For example, the display device 13 and the shifting units 16 and 18 can be modified for a different number of gear shifting positions. The number of gear shifting positions or stages will depend upon the number of gears or sprockets used in the bicycle's transmission. In other words, while the gear indicator displays 11a and 11b and shifting units 16 and 18 are illustrated as three-stage and six-stage units, respectively, it will be apparent to those skilled in the art from this disclosure that additional stages or fewer stages can be provided as needed and/or desired.

Referring now to FIGS. 2-9, the mounting member 12 will now be explained in more detail. In FIGS. 2-9, the mounting member 12 is clamped onto the handlebar 14 with the outer diameter $D_1$. In the illustrated embodiment, the outer diameter $D_1$ can be, for example, 25.4 millimeters. The mounting member 12 basically includes a component support portion 20, a first tubular clamping portion 22 and a second tubular clamping portion 24. The mounting member 12 utilizes two of the adapter members 26 and a pair of fasteners 28 to couple the mounting member 12 to the handlebar 14. In particular, the fasteners 28 are preferably threaded bolts. Each fastener 28 (bolt) is preferably threadedly coupled to a nut 30 in order to clamp the tubular clamping portions 22 and 24 of the mounting member 12 onto the handlebar 14 at two locations that are longitudinally spaced from each other, as explained below in more detail.

Preferably, the component support portion 20, the first tubular clamping portion 22 and the second tubular clamping portion 24 are each constructed of a lightweight, rigid material such as hard plastic, synthetic resin, metallic material or any other material that is well known in the bicycle art. More specifically, the component support portion 20, the first tubular clamping portion 22 and the second tubular clamping portion 24 are preferably integrally formed together as a one-piece, unitary member by casting a lightweight material such as plastic or lightweight metal alloy. In any case, the component support portion 20 is preferably non-movably fixedly coupled with the first and second tubular clamping portions 22 and 24.

One of the adapter members 26 is preferably mounted to each tubular clamping portion 22 and 24 to contact the outside surface of the handlebar 14 when the tubular clamping portion 22 and 24 are clamped onto the handlebar 14. Accordingly, when the fasteners 28 are tightened to non-movably clamp the tubular clamping portions 22 and 24 onto the handlebar 14, the component support portion 20 is preferably non-movably supported on the handlebar 14. In this embodiment, the component support portion 20 is arranged and configured to support the gear indicator displays 11a and 1b of the display device 13 on the handlebar 14. Of course, it will be apparent to those skilled in the art from this disclosure that various other components can be supported in accordance with the present invention, as needed and/or desired. For example, the a cycle computer, lamps and/or the display device 13 can be supported in accordance with the present invention as discussed below with reference to other embodiments of the present invention.

The first and second tubular clamping portions 22 and 24 are substantially identical to each other, except that they are mirror images of each other. Accordingly, only one of the tubular clamping portions 22 and 24 (i.e., the first tubular clamping portion 22) will be discussed in detail herein. However, it should be apparent to those skilled in the art from this disclosure that the descriptions of the first tubular clamping potion 22 also apply to the second tubular clamping portion 24, except as explained and illustrated herein. The tubular clamping portion 22 is basically a substantially C-shaped member that includes a first end section 32, a second (free) end section 34 and a curved section 36 extending around a center axis X between the first and second end sections 32 and 34 to form a split ring configuration with an attachment slot 38. A connecting section 40 extends between the component support portion 20 and the tubular clamping portion 22 (i.e., from both the first end section 32 and the curved section 36 to the component support portion 20).

The first end section 32 preferably includes an unthreaded blind bore 32a and a nut receiving opening 32b. The blind bore 32a is configured to rotatably receive the fastener 28 therein, while the nut receiving opening 32b is configured to non-rotatably receive the nut 30 therein to prevent rotation of the nut 30. The second (free) end section 34 preferably includes an unthreaded through bore 34a and a head receiving recess 34b. The through bore 34a is configured to rotatably receive the fastener 28 therethrough, while the recess 34b is configured to rotatably receive the head of the fastener 28.

Thus, when one of the fasteners 28 is threaded into the nut 30 that is located in the nut receiving opening 32b, the end sections 32 and 34 will move toward each other to decrease the effective inner diameter of the curved section 36 in a relatively conventional manner. In other words, an inner diameter $D_3$ of the curved section 36 is adjustable. Accordingly, each bolt 28 and respective nut 30 form parts of a tightening structure that is coupled to the end sections 32 and 34 to selectively reduce the adjustable inner diameter $D_3$ of the tubular clamping portion 22.

The curved section 36 includes a first projection 37a, a second projection 37b and a curved inner surface 37c extending between the projections 37a and 37b. The projections 37a and 37b project radially inwardly from the curved inner surface 37c. The projections 37a and 37b extend in an axial direction substantially parallel to the center axis X. The curved inner surface 37c is configured to retain one of the adapter members 26 thereon, while the projections 37a and 37b are arranged and configured to contact the ends of the adapter member 26 to prevent circumferential movement of the adapter member 26 about the center axis X. The first projection 37a is arranged at the first end section 32, while the second projection 37b is arranged at the second (free) end section 34.

Referring still to FIGS. 2-9, the adapters 26 will now be explained in more detail. The adapters 26 are identical, and thus, only one of the adapters 26 will be explained in detail herein. Each adapter 26 is preferably a C-shaped member that basically includes a pair of free ends 27a and 27b with inner and outer curved surfaces 27c and 27d extending between the free ends 27a and 27b to form a split ring configuration with a split 27e arranged between the free ends 27a and 27b. Each adapter member 26 is preferably constructed of a resilient material such as soft resin or rubber as a one-piece, unitary member. In any case, the adapter members 26 are preferably constructed of a more resilient material than the mounting member 12.

The curved inner surface 27c is preferably a smooth surface. However, it will be apparent to those skilled in the art from this disclosure that the inner surface 27c could be modified if needed and/or desired. For example, the inner surface 27c could be a segmented inner surface is discussed below with reference to the adapter members 26'. In any case, the inner surface of the adapters is preferably configured and arranged to cooperate with the appropriate handlebar such that the mounting member 12 can be clamped thereto.

In this embodiment, the curved inner surface 27c is configured to continuously contact the outer surface of the handlebar 14 when the respective fastener 28 is tightened. Specifically, the curved outer surface 27d is configured to be removably arranged on (i.e., contact) the curved inner surface 37c of the clamping portion 22 to effectively reduce the adjustable inner diameter $D_3$ of the tubular clamping portion 22 (i.e., to be optimal to be clamped onto the handlebar 14). Preferably, the curved outer surface 27d has a U-shaped configuration as viewed circumferentially to form a circumferential channel or recess that partially receives the curved section 36 to prevent axial movement of the adapter member 26 relative to the tubular clamping portion 22.

The free ends 27a and 27b of the adapter member 26 preferably contact the protrusions 37a and 37b to prevent circumferential movement of the adapter member 26 relative to the tubular clamping portion 22 when the adapter member 26 is mounted thereon. In other words, the adapter member 26 preferably has a circumferential length corresponding to the circumferential length of the curved inner surface 37c of the tubular clamping portion 22. Accordingly, when the adapter member 26 is mounted on the curved inner surface 37c of the tubular clamping portion 22, the split 27e of the adapter member 26 remains aligned with the attachment slot 38.

In other words, the inner surface 37c of the tubular clamping portion 22 and the adapter member 26 are arranged and configured to align the split 27e of the adapter member 26 with the attachment slot 38 and to prevent circumferential movement of the adapter member 26 relative to the inner surface 37c of the tubular clamping portion 22. If the split 27e of the adapter member 26 is misaligned with the attachment slot 38 (i.e., such as can happen in the prior art), the fixing force might not be sufficient as desired for some situations. In other words, if the split 27e of the adapter member 26 is misaligned with the attachment slot 38, the mounting member 12 might not be attached as securely to the handlebar 14 or 14' as desired.

Preferably, the adapter member 26 and the curved inner surface 37c extend around at least a majority of the handlebar 14 relative to the center axis X. More specifically, the adapter member 26 and the inner surface 37c of the tubular clamping portion 22 preferably extend at least about 270 degrees around the center axis X in a continuous, non-segmented manner. However, it will be apparent to those skilled in the art from this disclosure that various modifications are possible so long as the handlebar 14 can be securely clamped.

Figure 9:
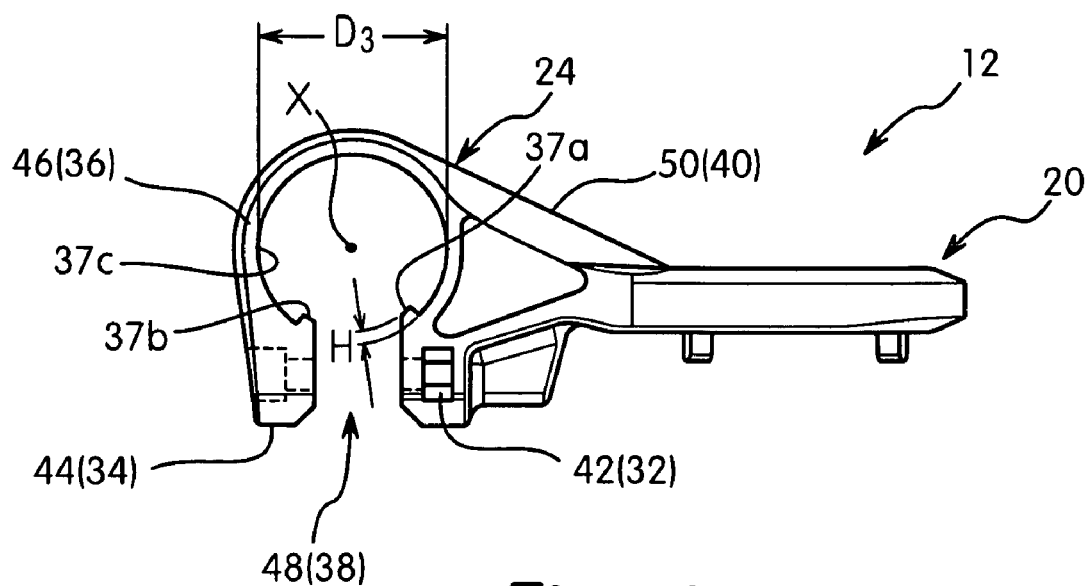
FIG. 9 is a side elevational view of the mounting member of the mountable bicycle structure illustrated in FIGS. 2-7, with the handlebar, adapter members and fasteners removed for the purpose of illustration.
Figure 10:
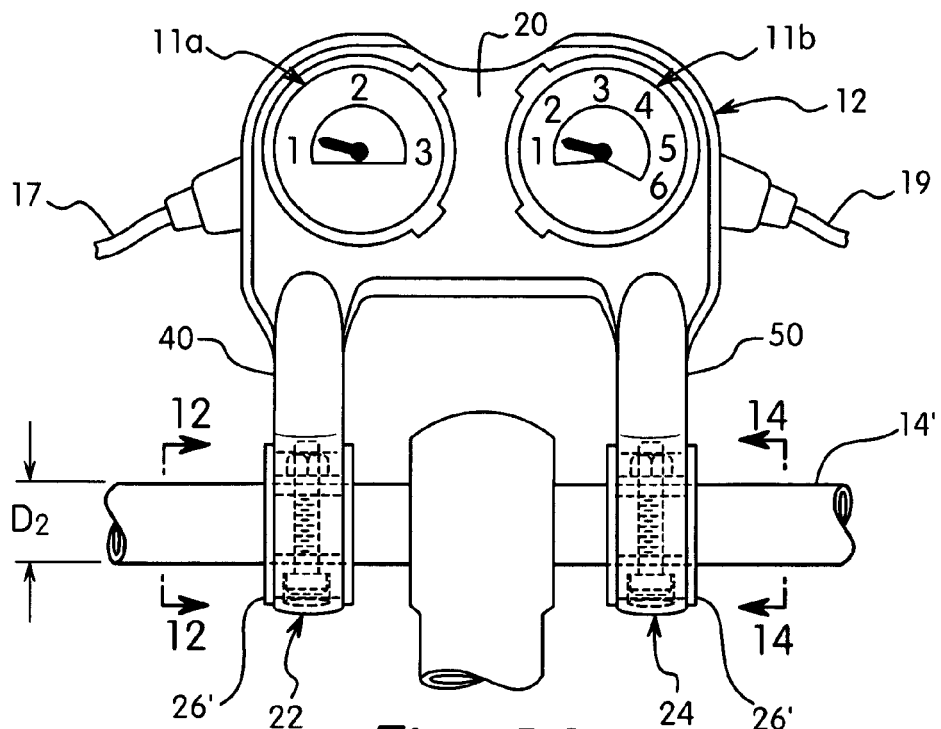
FIG. 10 is an enlarged, partial top plan view of a portion of a modified handlebar equipped with a modified mountable bicycle structure having modified adapter members in accordance with the first embodiment of the present invention.
Figure 11:
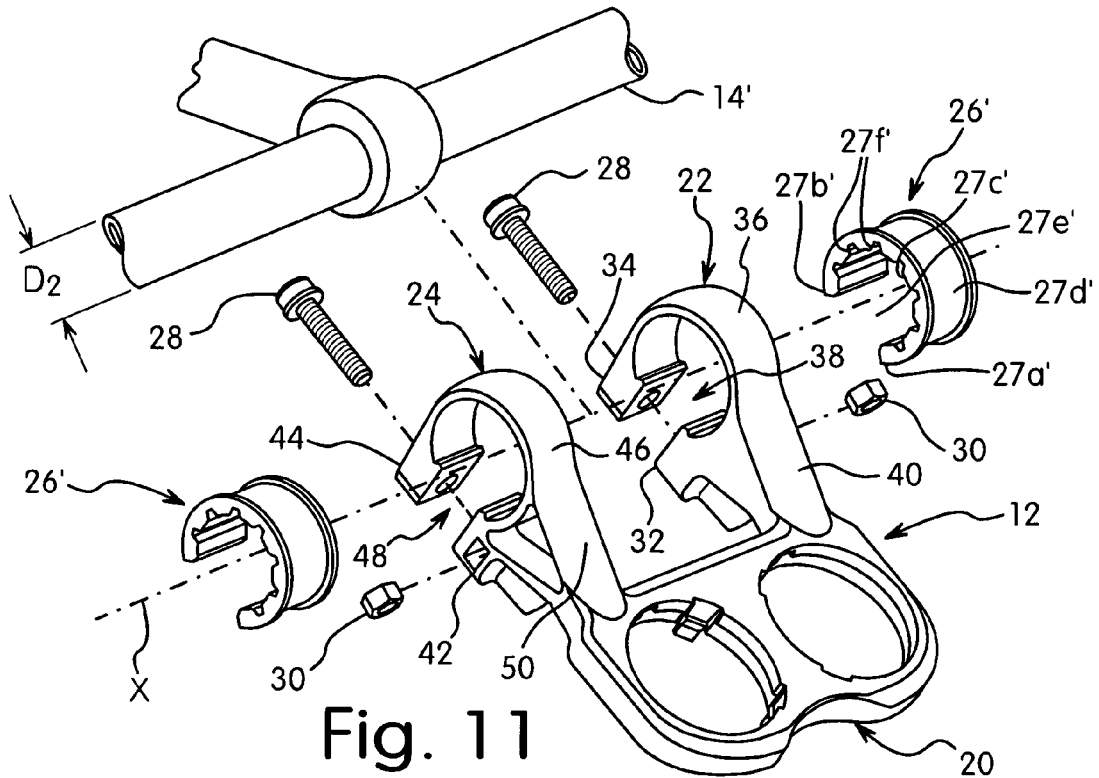
FIG. 11 is an exploded, top perspective view of the portion of a modified handlebar and the mounting member of the modified mountable bicycle structure using the modified adapter members illustrated in FIG. 10.

The adapter member 26 preferably has a minimum radial thickness T at least slightly larger than a maximum radial height H of the projections 37a and 37b such that the projections 27a and 27b do not normally contact the outer surface of the handlebar 14, as best seen in FIGS. 4, 5 and 9.

As mentioned above, the second tubular clamping portion 24 is identical to the first tubular clamping portion 22, except the second tubular clamping portion 24 is a mirror image of the first tubular clamping portion 22. Accordingly, the second tubular clamping portion 24 is basically a substantially C-shaped member that includes a first end section 42, a second (free) end section 44 and a curved section 46 extending between the first and second end sections 42 and 44 to form a split ring configuration with an attachment slot 48. A connecting section 50 extends between the component support portion 20 and the tubular clamping portion 24 (i.e., from both the first end section 42 and the curved section 46 to the component support portion 20).

As mentioned above, since the parts of the second tubular clamping portion 24 are identical to the parts of the first tubular clamping portion 22, except that they are mirror images of each other, the second tubular clamping portion 24 will not be discussed in further detail herein. Rather, it will be apparent to those skilled in the art from this disclosure that the second tubular clamping portion 24 functions in a manner substantially identical to the first tubular clamping portion 22 (i.e., with one of the adapter members 26, one of the fasteners 28 and one of the nuts 30).

Referring still to FIGS. 2-9, component support portion 20 will now be discussed in more detail. The component support portion 20 is basically a plate-shaped member with a pair of mounting openings 21a and 21b formed therein. The gear indicator displays 11a and 11b are mounted in the mounting openings 21a and 21b, respectively. Specifically, each of the mounting openings 21a and 21b preferably includes a pair of flexible tabs such that one of the gear indicator displays 11a and 11b can be mounted therein via a snap fit in a conventional manner. In other words, each of the gear indicator displays 11a and 11b preferably includes a mating structure that fits within one of the mounting openings 21 and 21b and engages the flexible tabs to couple the gear indicator displays 11a and 11b (display device) is coupled to the component support portion 20.

Referring now to FIGS. 10-16, clamping the mounting member 12 onto the handlebar 14' with the smaller outer diameter $D_2$ in accordance with the present invention will now be explained in more detail. The handlebar 14' has a smaller outer diameter $D_2$ than the outer diameter $D_1$ of the handlebar 14. In the illustrated embodiment, the outer diameter $D_2$ can be, for example, 22.2 millimeters. Thus, two modified, identical, adapter members 26' are preferably utilized to clamp the mounting member 12 onto the smaller handlebar 14'.

The modified adapter members 26' are identical to the adapter members 26, except that the adapter members 26' have an increased minimum effective thickness T' that is larger than the thickness T of the adapter members 26, and the adapter members 26' include a segmented inner surface 27c'. Accordingly, the adapter members 26' basically include a pair of free ends 27a' and 27b' with inner and outer curved surfaces 27c' and 27d' extending between the free ends 27a' and 27b' to form a split ring configuration with a split 27e' arranged between the free ends 27a' and 27b'. The curved inner surface 27c' is preferably a segmented, curved surface with a plurality of axially extending grooves 27f ' formed therein. The grooves 27f' allow the adapter members 26' to curve and/or bend despite the increased thickness T'.

The adapter members 26' are also functionally identical to the adapter members 26. Thus, the adapter members 26' will not be discussed in detail herein. Rather, it will be apparent to those skilled in the art from this disclosure that the adapter members 26' are identical to the adapter members 26, except as explained and illustrated herein. Moreover, it will be apparent to those skilled in the art from this disclosure that the descriptions of the operation of the adapter members 26 also apply to the adapter members 26'.

In this embodiment, the display device 13, the mounting member 12, the fasteners 28, the nuts 30, and the adapter members 26 and/or 26' preferably form parts of a mountable bicycle structure in accordance with the present invention. However, it will be apparent to those skilled in the art from this disclosure that various modifications can be made to the mountable bicycle structure without departing from the scope of the present invention. For example, modified components can be coupled to modified mounting members in accordance with the present invention, as discussed below with reference to other embodiments of the present invention.

Of course, it will also be apparent to those skilled in the art from this disclosure that other bicycle components not disclosed herein could be provided with a mating structure to be coupled to the component support portion 20 as needed and/or desired, without departing from the scope of the present invention.

Second Embodiment

Referring now to FIGS. 17-20, a modified mounting member 212 in accordance with a second embodiment of the present invention will now be explained. This second embodiment is identical to the first embodiment, except that the mounting member 212 is provided with a modified component support portion 220 that supports a bicycle computer 215 in addition to the gear indicator displays 11a and 11b of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Furthermore, it will be apparent to those skilled in the art from this disclosure that the descriptions and illustrations of the first embodiment also apply to this second embodiment, except as explained and illustrated herein.

Figure 17:
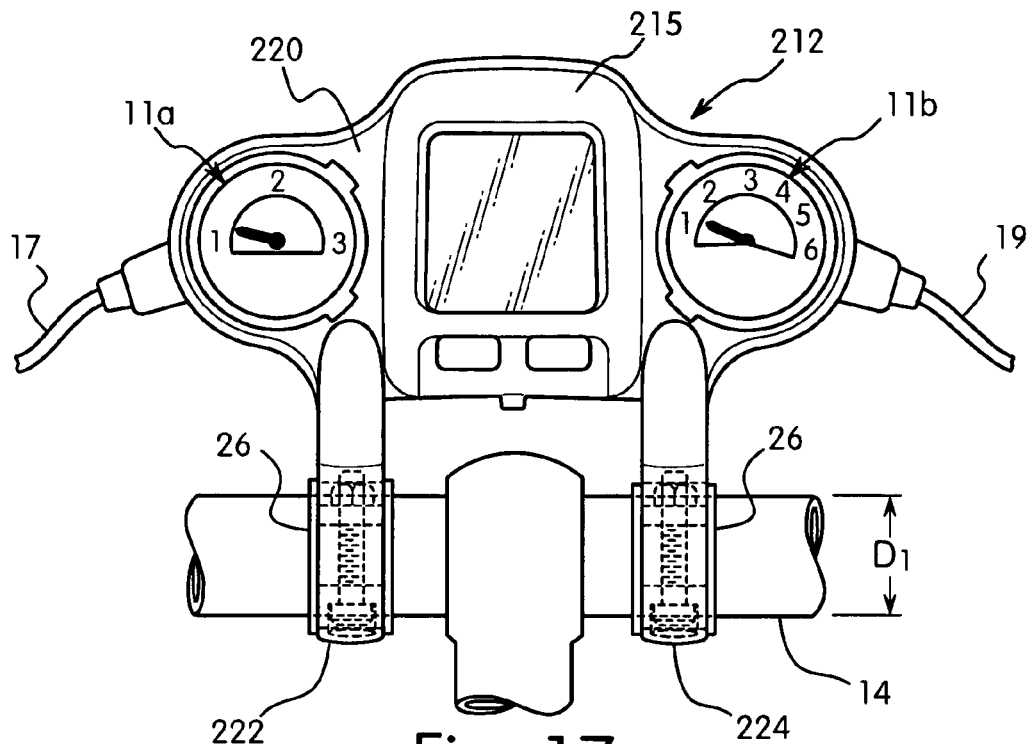
FIG. 17 is an enlarged, partial top plan view of a handlebar equipped with a modified mountable bicycle structure (i.e., with a cycle computer in addition to the indicator displays) in accordance with a second embodiment of the present invention.
Figure 18:
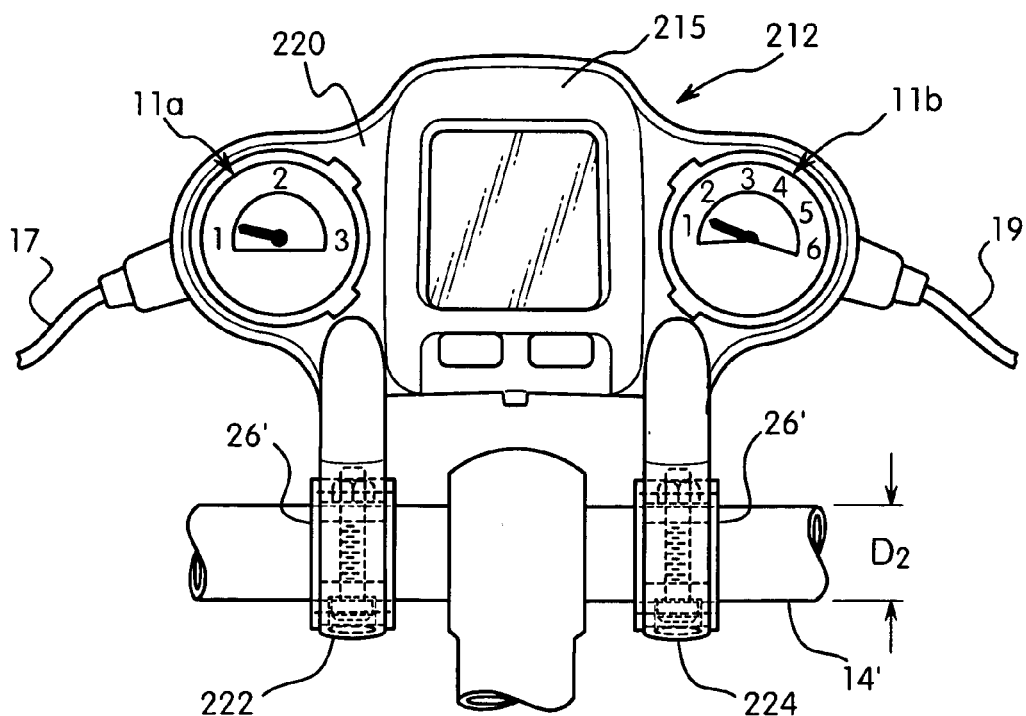
FIG. 18 is an enlarged, partial top plan view of a portion of a modified handlebar equipped with a further modified mountable bicycle structure having modified adapter members in accordance with the second embodiment of the present invention.
Figure 19:
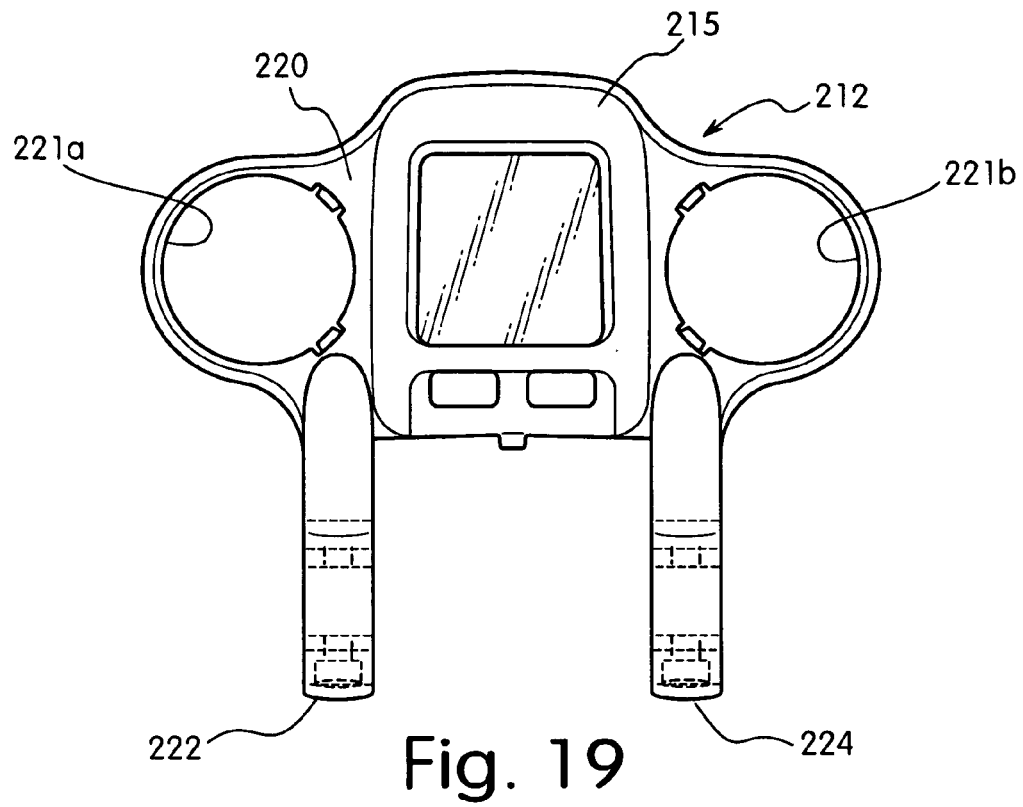
FIG. 19 is a top plan view of the mountable bicycle structure illustrated in FIGS. 17 and 18, with the handlebar, adapter members, fasteners and indicator displays removed for the purpose of illustration.
Figure 20:
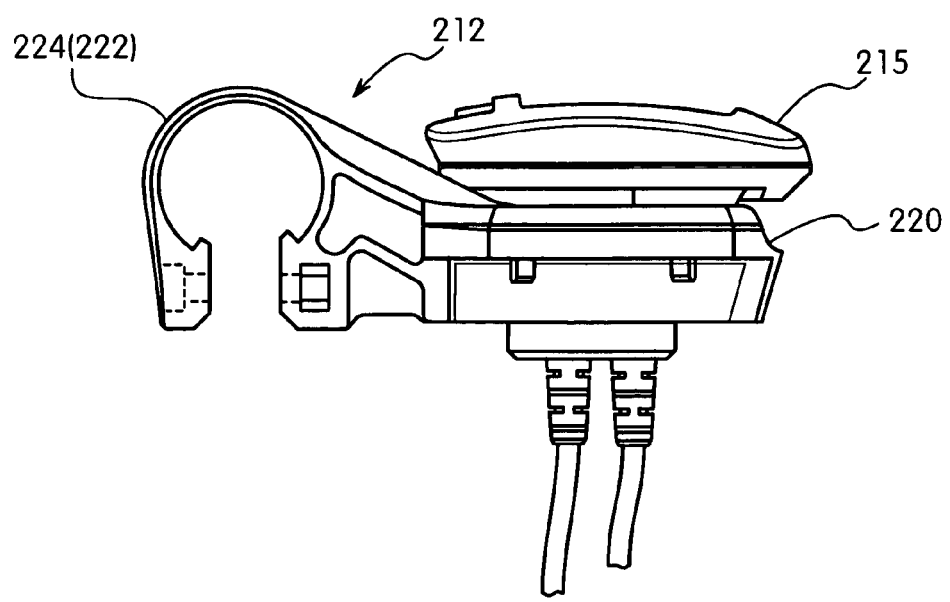
FIG. 20 is a side elevational view of the mounting member and cycle computer of the mountable bicycle structure illustrated in FIGS. 17-19, with the handlebar, adapter members, fasteners and indicator displays removed for the purpose of illustration.

The modified mounting member 212 is clamped onto either the handlebar 14 or 14' via a pair of clamping portions 222 and 224 in a manner identical to the first embodiment, as best shown in FIGS. 17 and 18, respectively. Specifically, the clamping portions 222 and 224 are identical to the clamping portions 22 and 24, respectively, of the first embodiment. Thus, the clamping portions 222 and 224 preferably utilize the adapter members 26 or 26' in a manner identical to the first embodiment. The gear indicator displays 11a and 11b are coupled within mounting openings 221a and 221b in a manner identical to the first embodiment, except that the mounting openings 221a and 221b are arranged in different locations due to the presence of the bicycle computer 215 therebetween. The bicycle computer 215 is preferably coupled to the component mounting portion 220 in a conventional manner such as by a longitudinal sliding snap-fit as is well known in the bicycle art. In such an arrangement, the modified component support portion 220 would be provided with electrical cords extending downwardly therefrom that are electrically coupled to electrical contacts (not shown) formed on the upper side of the component support portion 220. In any case, because such connections are well known in the bicycle art, and because the connection between the cycle computer 215 and the modified mounting member 220 is not critical to the present invention, this connection will not be discussed in further detail herein. In other words, it will be apparent to those skilled in the art from this disclosure that the cycle computer 215 can be coupled to the component support portion in any suitable manner that is known in the bicycle art.

Third Embodiment

Figure 21:
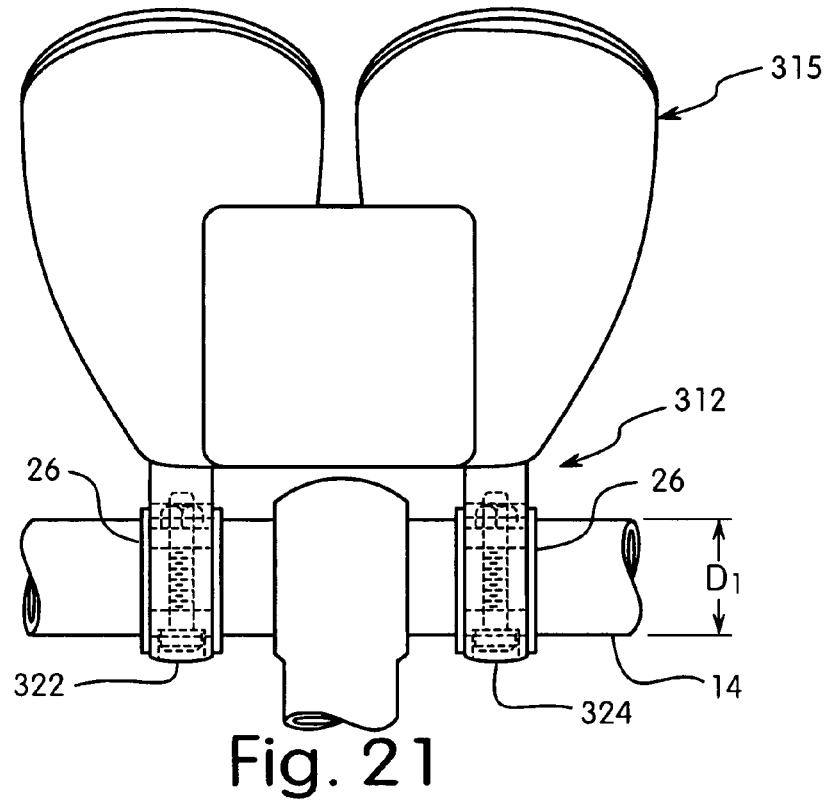
FIG. 21 is an enlarged, partial top plan view of a handlebar equipped with a modified mountable bicycle structure (i.e., with a pair of lamps/lights rather than the indicator displays and/or cycle computer) in accordance with a third embodiment of the present invention.
Figure 22:
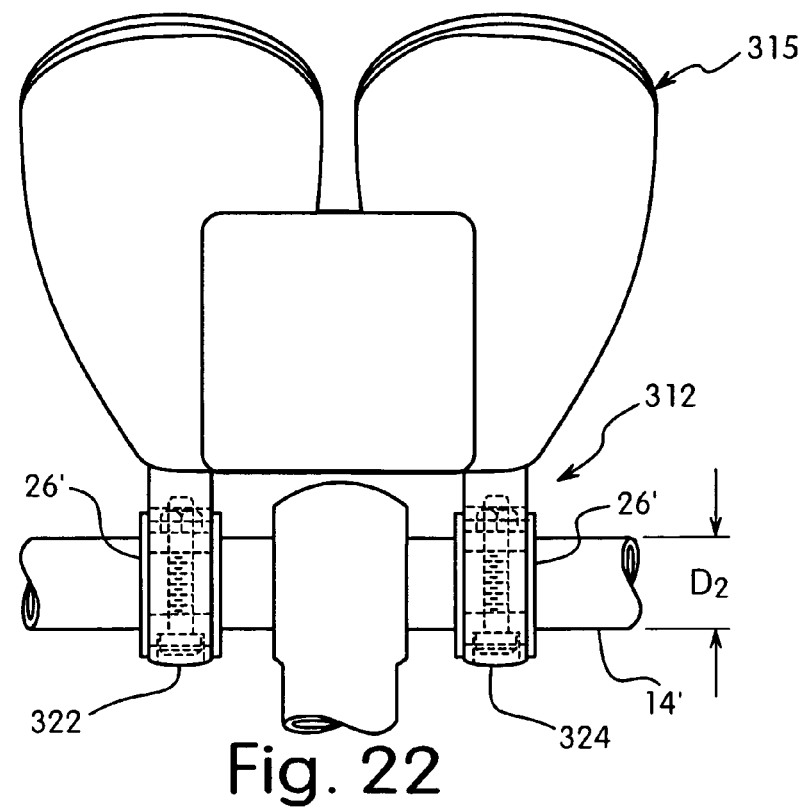
FIG. 22 is an enlarged, partial top plan view of a portion of a modified handlebar equipped with a further modified mountable bicycle structure having modified adapter members in accordance with the third embodiment of the present invention.
Figure 23:
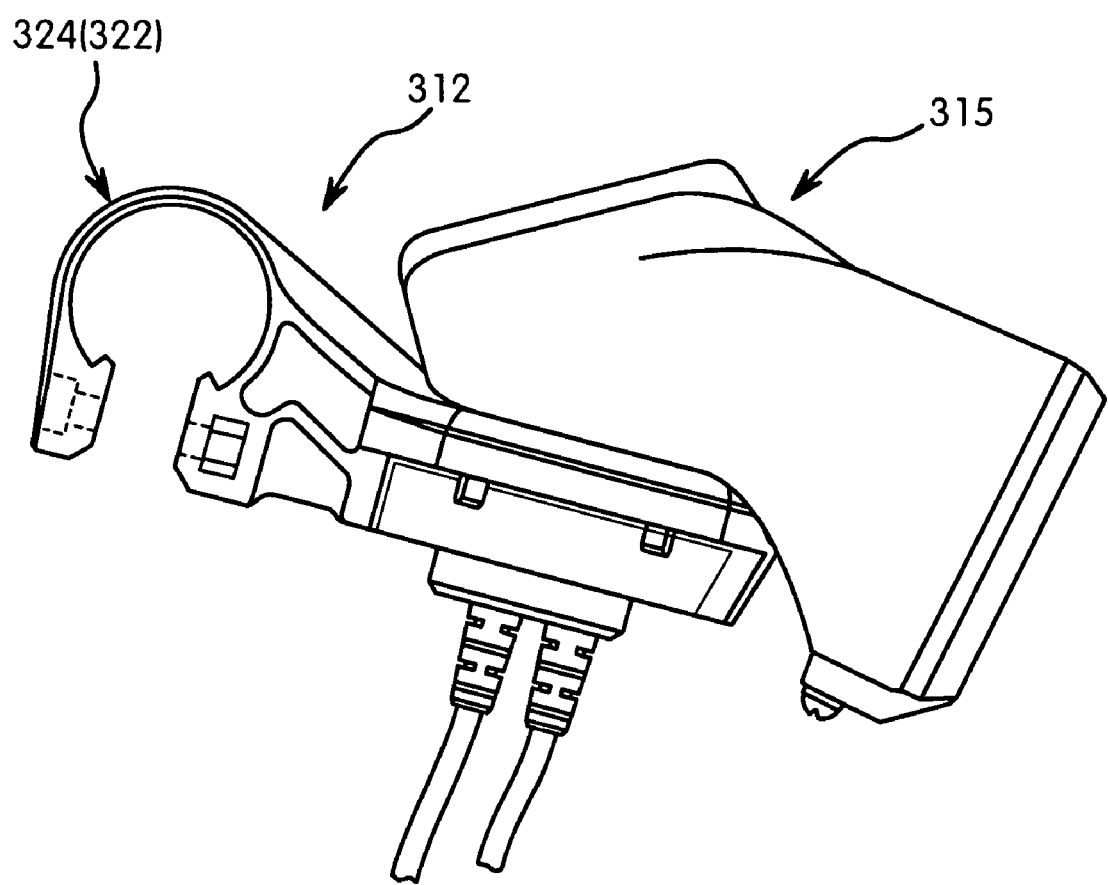
FIG. 23 is a side elevational view of the mounting member and lights/lamps of the mountable bicycle structure illustrated in FIGS. 21 and 22, with the handlebar, adapter members and fasteners removed for the purpose of illustration.

Referring now to FIGS. 21-23, a modified mounting member 312 in accordance with a third embodiment of the present invention will now be explained. This third embodiment is identical to the first embodiment, except that the mounting member 312 is provided with a modified component support portion 320 that supports a bicycle lamp/light 315 instead of the gear indicator displays 11a and 11b of the first embodiment. In view of the similarity between the first and third embodiments, the parts of the third embodiment that are identical to the parts of the first embodiment will be given the same reference numerals as the parts of the first embodiment.

Moreover, the descriptions of the parts of the third embodiment that are identical to the parts of the first embodiment may be omitted for the sake of brevity. Furthermore, it will be apparent to those skilled in the art from this disclosure that the descriptions and illustrations of the first embodiment also apply to this third embodiment, except as explained and illustrated herein.

The modified mounting member 312 is clamped onto either the handlebar 14 or 14' via a pair of clamping portions 322 and 324 in a manner identical to the first embodiment, as best shown in FIGS. 21 and 22, respectively. Specifically, the clamping portions 322 and 324 are identical to the clamping portions 22 and 24, respectively, of the first embodiment. Thus, the clamping portions 322 and 324 preferably utilize the adapter members 26 or 26' in a manner identical to the first embodiment. The bicycle lamp/light 315 is conventional. Thus, the bicycle lamp/light 315 will not be discussed and/or illustrated in detail herein. Also, the bicycle lamp/light 315 is preferably coupled to the component mounting portion 320 in a conventional manner such as by a snap fit or by one or more fasteners. In any case, because such connections are well known in the bicycle art, and because the connection between the bicycle lamp/light 315 and the modified mounting member 320 is not critical to the present invention, this connection will not be discussed in further detail herein. In other words, it will be apparent to those skilled in the art from this disclosure that the bicycle lamp/light 315 can be coupled to the component support portion in any suitable manner that is known in the bicycle art.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Moreover, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A mountable bicycle structure comprising:
    a component support portion;
    a tubular clamping portion coupled to the component support portion, the tubular clamping portion having a split ring configuration with an attachment slot, a first end section, a second end section and a curved inner surface extending between the first and second end sections to define an adjustable inner diameter with a center axis;
    a tightening structure coupled to the first and second end sections of the tubular clamping portion to selectively reduce the adjustable inner diameter of the tubular clamping portion; and
    an adapter member having a split ring configuration with an outer surface removably arranged on the curved inner surface of the tubular clamping portion to effectively reduce the adjustable inner diameter when the adapter member is arranged on the curved inner surface of the tubular clamping portion, the adapter member having a pair of free ends with a split therebetween and a curved interior surface extending between the free ends, the tubular clamping portion having at least one projection non-movably fixed thereto that extends radially inwardly from the curved inner surface toward the center axis such that the projection contacts one of the free ends of the adapter member when the adapter member is arranged on the curved inner surface of the tubular clamping portion to align the split of the adapter member with the attachment slot, the projection extending radially inwardly from the curved inner surface by a radial height smaller than a radial thickness of the adapter member measured between the curved inner surface of the tubular clamping portion and the curved interior surface of the adapter member such that the adapter member projects radially inwardly beyond the projection.

2. The mountable bicycle structure according to claim 1, wherein
the tubular clamping portion includes a pair of projections extending radially inwardly from the curved inner surface of the tubular clamping portion to prevent circumferential movement of the adapter member relative to the curved inner surface.

3. The mountable bicycle structure according to claim 2, wherein
a first of the projections is located at the first end section of the tubular clamping portion and a second of the projections is located at the second end section of the tubular clamping portion.

4. The mountable bicycle structure according to claim 3, wherein
the projections are arranged to contact the free ends of the adapter member to prevent relative circumferential movement of the adapter member.

5. The mountable bicycle structure according to claim 4, wherein
the outer surface of the adapter member has a circumferential dimension that is the same as a circumferential dimension of the curved inner surface of the tubular clamping portion.

6. The mountable bicycle structure according to claim 5, wherein
each of the projections of the tubular clamping portion has a circumferentially facing abutment surface that contacts one of the free ends of the adapter member, the abutment surfaces being spaced from the attachment slot such that the adapter member does not extend into the attachment slot.

7. The mountable bicycle structure according to claim 2, wherein
each of the projections of the tubular clamping portion has a circumferentially facing abutment surface that contacts one of the free ends of the adapter member, the abutment surfaces being spaced from the attachment slot such that the adapter member does not extend into the attachment slot.

8. The mountable bicycle structure according to claim 2, wherein
the projections are arranged on opposite sides of the attachment slot from each other.

9. The mountable bicycle structure according to claim 1, wherein
the adapter member and the inner surface of the tubular clamping portion extend at least about 270 degrees around the center axis.

10. The mountable bicycle structure according to claim 1, wherein
the component support portion and the tubular clamping portion are integrally formed together as a one-piece, unitary member.

11. The mountable bicycle structure according to claim 1, wherein
the adapter member is constructed of resilient material.

12. The mountable bicycle structure according to claim 11, wherein
the adapter member is constructed of rubber.

13. The mountable bicycle structure according to claim 11, wherein
the adapter member is constructed of resin.

14. The mountable bicycle structure according to claim 11, wherein
the adapter member is constructed as a one-piece, unitary member.

15. The mountable bicycle structure according to claim 1, wherein
the curved interior surface of the adapter member is a continuous curved surface.

16. The mountable bicycle structure according to claim 1, wherein
the curved interior surface of the adapter member is a segmented curved surface with a plurality of axially extending grooves formed therein.

17. The mountable bicycle structure according to claim 1, further comprising
a bicycle component coupled to said component support portion.

18. The mountable bicycle structure according to claim 17, wherein
the bicycle component includes a bicycle display device.

19. The mountable bicycle structure according to claim 1, wherein
the adapter member is a first adapter member with a predetermined first radial thickness sized and configured to be utilized on the tubular clamping portion when the mountable bicycle structure is mounted on a first tubular bicycle part with a predetermined first outer diameter; and the mountable bicycle structure further comprises
a second adapter member with a predetermined second radial thickness different from the first radial thickness that is sized and configured to be utilized on the tubular clamping portion when the mountable bicycle structure is mounted on a second tubular bicycle part with a predetermined second outer diameter different than the first outer diameter, the second adapter member being configured to be selectively mounted in place of the first adapter member.

20. The mountable bicycle structure according to claim 1, wherein
the adapter member has a circumferential dimension that is smaller than a circumferential dimension of the tubular clamping portion such that the adapter member does not extend into the attachment slot.

* * * * *